United States Patent [19]
Gohlke et al.

[11] Patent Number: 5,351,448
[45] Date of Patent: Oct. 4, 1994

[54] FIRE BARRIER

[75] Inventors: Henry Gohlke, Norman, Okla.; Roger L. Rumsey, Wichita, Kans.

[73] Assignee: Balco, Inc., Wichita, Kans.

[21] Appl. No.: 49,158

[22] Filed: Apr. 19, 1993

[51] Int. Cl.[5] .......................................... F16K 17/38
[52] U.S. Cl. ....................................... 52/1; 52/220.8; 52/232
[58] Field of Search ........................... 52/1, 232, 220.8

[56] References Cited

U.S. PATENT DOCUMENTS

| | | | |
|---|---|---|---|
| 3,976,825 | 8/1976 | Anderberg | 52/232 |
| 4,850,385 | 7/1989 | Harbeke | 52/232 |
| 5,103,609 | 4/1992 | Thoreson et al. | 52/232 |
| 5,105,592 | 4/1992 | MacMillan et al. | 52/232 |
| 5,155,957 | 10/1992 | Robertson et al. | 52/232 |

FOREIGN PATENT DOCUMENTS 3190540  1/1993  Japan ..................... 52/232

*Primary Examiner*—Carl D. Friedman
*Assistant Examiner*—Christopher Todd Kent
*Attorney, Agent, or Firm*—Hovey, Williams, Timmons & Collins

[57] ABSTRACT

A fire barrier is provided for use in connection with a structural wall having a hole through which a thermoplastic conduit normally extends. The barrier includes a housing having a side wall extending around the hole and the conduit, and defining an interior space extending between the conduit and the housing. A first end of the housing is attached to the structural wall, and the opposing end is closed around the conduit. A first support matrix is provided within the housing adjacent the second end, and defines a plurality of voids extending radially between the conduit and the side wall of the housing. A second support matrix provided adjacent the first axial end defines a plurality of longitudinal voids extending in a direction substantially parallel to the length of the conduit. An intumescent material substantially fills the voids of the support matrices so that as a fire adjacent the wall causes failure of the conduit, the intumescent material expands in the directions of orientation of the voids and forms a barrier that prevents the fire from propagating through the hole.

8 Claims, 3 Drawing Sheets

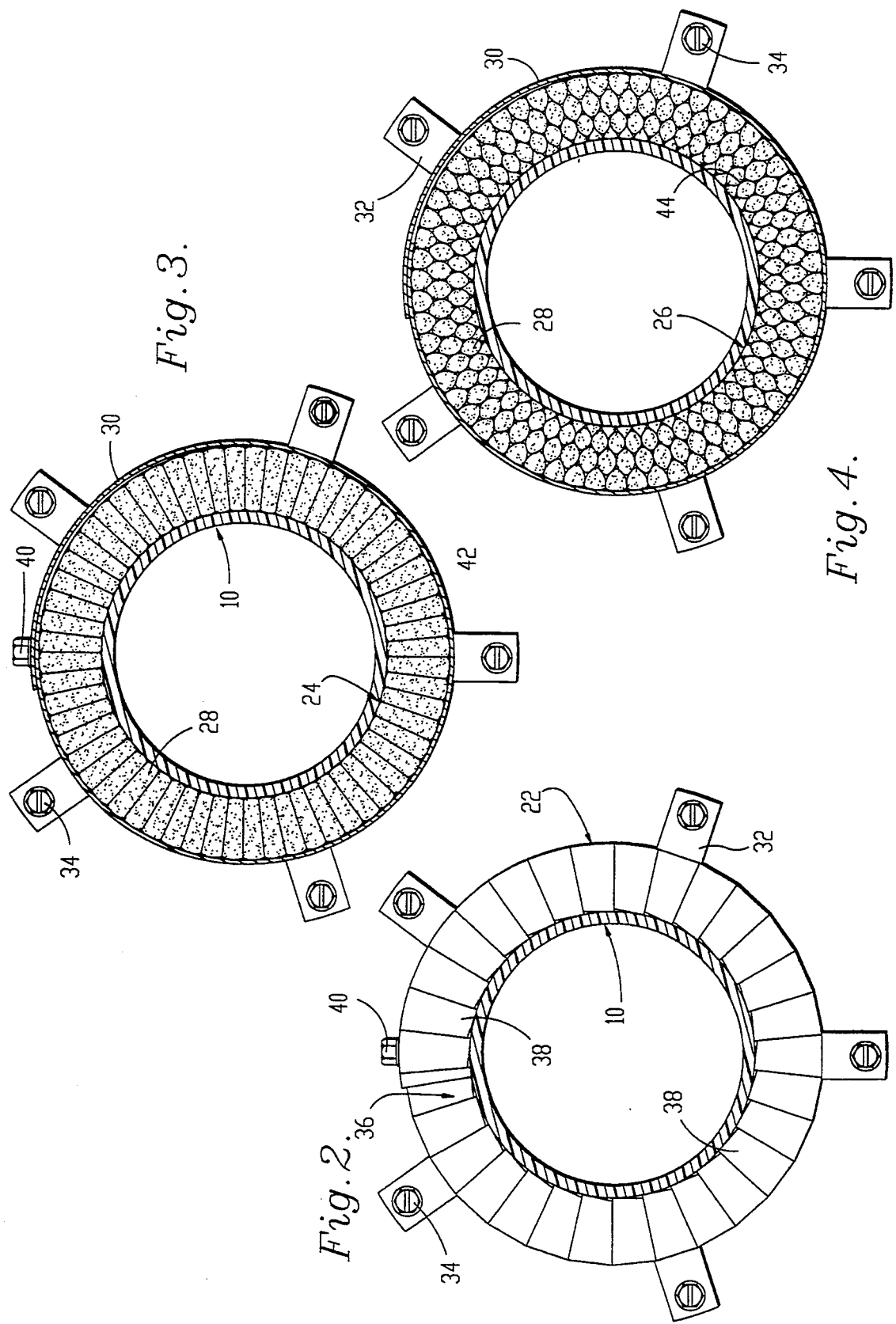

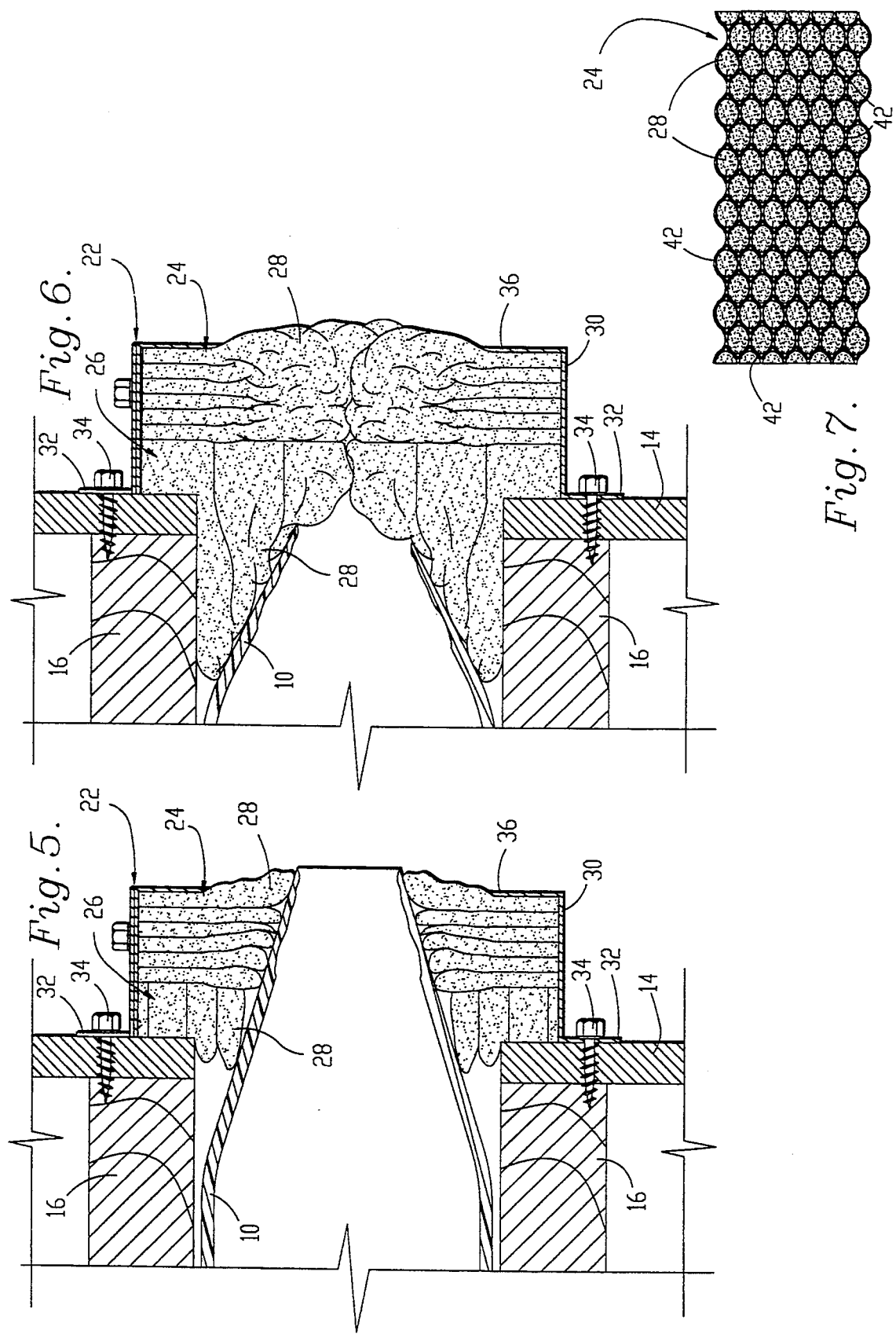

FIRE BARRIER

BACKGROUND OF THE INVENTION

1. Field of the Invention

The present invention relates generally to fire barriers and, more particularly, to a fire barrier for use in connection with a structural wall having a hole through which a thermoplastic conduit normally extends. During a fire, as the material forming the conduit melts, the barrier fills the hole in the structural wall.

2. Discussion of the Prior Art

In the construction of a fire rated structural wall, if it is necessary to provide a conduit extending through the wall, it is conventional to employ only metallic materials which do not deform or melt when exposed to the range of temperatures typically experienced in a fire.

If a thermoplastic material is used as a conduit in such a construction, heat from a fire deforms or melts the thermoplastic material, allowing the fire to propagate through the wall to the region on the opposite side of the wall. The term "thermoplastic" is used here broadly to define any material which becomes or remains soft when subjected to heat such that a conduit formed of such material loses its original form during a fire and exposes the hole in the structural wall to the fire.

It would be desirable to provide a fire barrier for use in connection with thermoplastic conduits for closing off the hole in a structural wall in the event of thermal deformation of the conduit.

OBJECTS AND SUMMARY OF THE INVENTION

It is an object of the present invention to provide a fire barrier including a housing within which an intumescent material is stored so that, during a fire, as the conduit deforms under exposure to the heat, the intumescent material expands to fill the hole in the structural wall through which the conduit normally extends.

It is another object of the invention to provide a fire barrier which not only closes the hole in a structural wall during a fire, but also substantially fills any space within the hole between the deformed conduit and the structural wall to prevent the fire from propagating past the structural wall through the hole.

In accordance with these and other objects evident from the following description of a preferred embodiment of the present invention, a fire barrier is provided for use in connection with a structural wall having a hole through which a thermoplastic conduit normally extends. The fire barrier includes a housing having a side wall extending around the hole and the conduit and defining an interior space extending between the conduit and the housing, a first axial end attached to the structural wall, and a second axial end provided with an end wall extending between the side wall and the conduit to substantially close off the interior space.

A first support matrix is provided within the housing adjacent the second axial end and defines a plurality of voids extending radially between the conduit and the side wall of the housing. A second support matrix is provided within the housing adjacent the first axial end and defines a plurality of longitudinal voids extending in a direction substantially parallel to the length of the conduit. An intumescent material substantially fills the voids of the first and second support matrices so that as a fire adjacent the wall causes failure of the conduit, the intumescent material expands in the directions of orientation of the voids and forms a barrier that prevents the fire from propagating through the hole.

By providing a fire barrier in accordance with the present invention, numerous advantages are achieved. For example, by providing an intumescent material stored within the radially extending voids of a first support matrix, expansion of the intumescent material during a fire is carried out in the radial direction, closing off the second end of the housing.

In addition, by providing the second support matrix filled with intumescent material, expansion of the material during a fire occurs in the longitudinal direction such that the material is forced beyond the hole of the structural wall into the interior thereof, and substantially fills the space between the deformed conduit and the hole in the structural wall. In this manner, a barrier is formed which prevents fire from entering the wall from adjacent the first end of the housing.

BRIEF DESCRIPTION OF THE DRAWING FIGURES

A preferred embodiment of the present invention is described in detail below with reference to the attached drawing figures, wherein:

FIG. 2 is a sectional view taken along line 2—2 of FIG. 1;

FIG. 3 is a sectional view taken along line 3—3 of FIG. 1;

FIG. 4 is a sectional view taken along line 4—4 of FIG. 1;

FIG. 5 is a fragmentary side sectional view of one of the fire barriers, illustrating expansion of the intumescent material during the initial stages of deformation of the thermoplastic conduit;

FIG. 6 is a fragmentary side sectional view of one of the fire barriers, illustrating expansion of the intumescent material during the final stages of deformation of the thermoplastic conduit; and FIG. 7 is a plan view of a piece of support matrix material, illustrating a plurality of voids formed in the matrix and filled with intumescent material.

DETAILED DESCRIPTION OF THE PREFERRED EMBODIMENT

Figure 1:
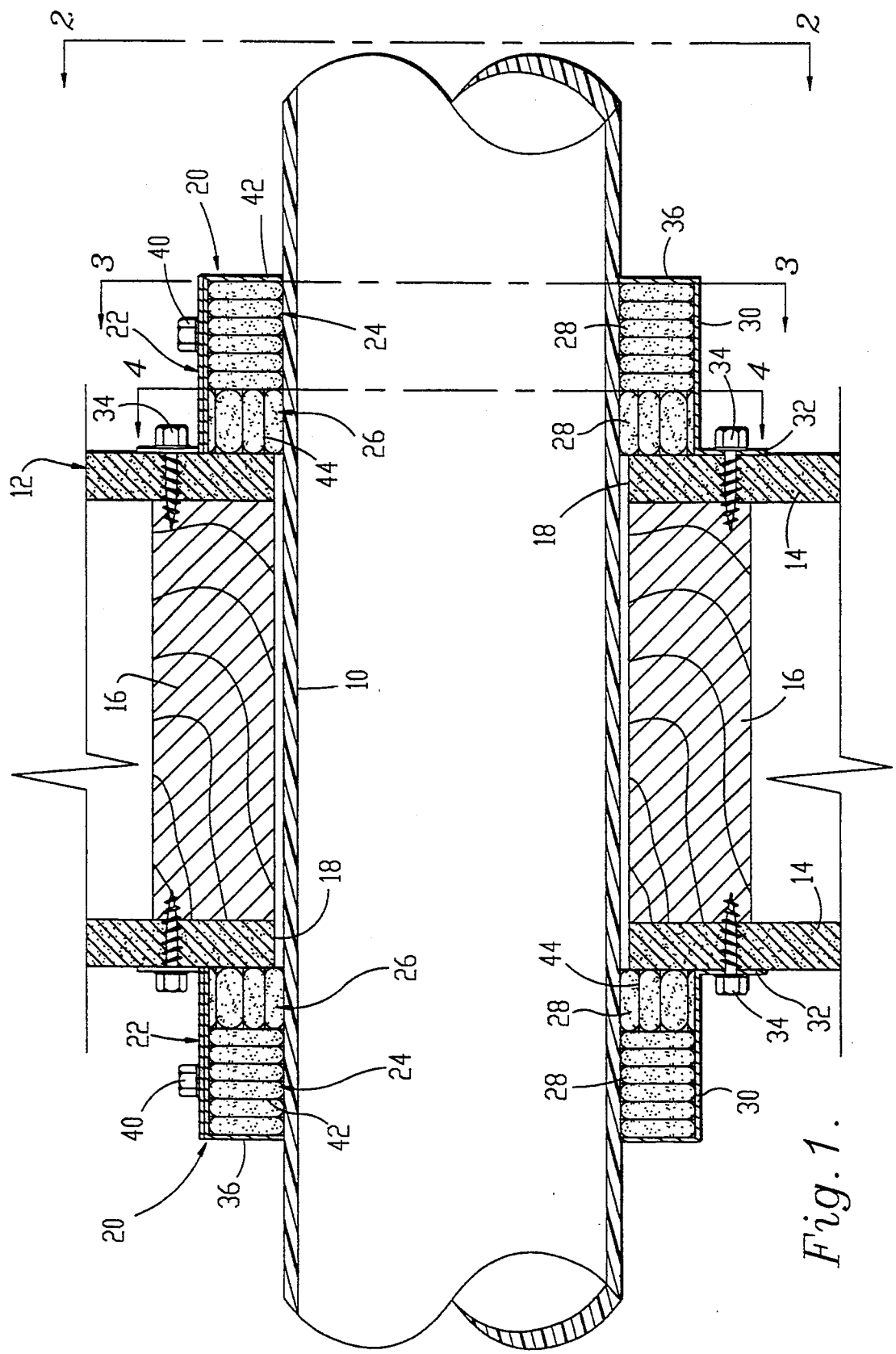
FIG. 1 is a side sectional view of a pair of fire barriers constructed in accordance with the present invention, illustrating the barriers assembled on a structural wall at a junction between the wall and a thermoplastic conduit.

The junction at which a conduit 10 extends through a structural wall 12 is shown in FIG. 1. The wall includes a pair of opposed, fire resistent panels 14 supported on spaced studs 16, and is constructed in a conventional manner. Holes 18 are formed in the panels opposite one another and between the studs at the location at which the conduit passes through the wall, the holes being of a diameter slightly larger than the diameter of the conduit in order to permit installation of the conduit.

The conduit 10 may be formed of any desired material, although application of the present invention is directed particularly to conduits formed of materials which become or remain soft when subjected to heat such that they lose their original form during a fire, exposing the hole 18 in the structural wall to the fire. For example, it would be possible to employ materials such as PVC or other plastics or rubber materials in the conduit.

Two separate fire barriers 20 are illustrated in FIG. 1 for use at each conduit/panel junction, with one fire barrier being provided on each side of the structural wall 12. Because the two barriers 20 are substantially identical to one another, only one is described. However, reference numerals are provided on both barriers so that reference can be made to the barrier on either side of the structural wall.

The barrier 20 broadly includes a housing 22, first and second support matrices 24, 26 retained within the housing adjacent the conduit, and an intumescent material 28 filling the region in and around the support matrices within the housing.

The housing 22 is formed of fire resistant material, preferably sheet metal or the like, and includes a tubular side wall 30 having a diameter greater than the diameter of the hole in the structural wall so that the side wall extends around the hole and the conduit and defines an interior space extending between the conduit and the housing.

A first axial end of the housing is attached to the structural wall, and preferably includes a plurality of radially outward extending tabs 32 connected to the side wall for permitting attachment of the housing to the structural wall 12. Sheet metal screws 34 or the like are preferably used to secure the housing to the structural wall, and are threaded through the tabs into the wall during installation.

A second axial end of the housing, opposite the first axial end, is provided with an end wall 36 extending radially inward from the side wall 30 toward the conduit 10, and substantially closes off the interior space of the housing to define a closed, annular space extending longitudinally between the wall and the second end of the housing, and radially between the conduit and the housing.

The end wall 36 is shown in FIG. 2, and preferably includes a plurality of tabs 38 which are unitary with the side wall, and which are folded inward over one another to define the end wall. As is also shown in FIG. 2, the housing may be formed of a single sheet of material, with the tabs 32, 38 cut into the material during formation. During assembly, the side wall 30 is rolled to that the side edges thereof overlap one another. Thereafter, a metal screw or the like 40 is threaded through the material along the region of overlap to secure the side wall in the tubular form, and the tabs 32, 38 are bent to their desired, illustrated positions.

The first support matrix 24 is provided within the housing adjacent the end wall 36, and defines a plurality of voids extending radially between the conduit and the side wall of the housing. As shown in FIG. 7, which illustrates the appearance of the first support matrix when viewed in a radially outward direction from the conduit, the support matrix 24 is formed of a honeycomb material including a plurality of ring-shaped, serpentine walls 42 each presenting a series of alternating, oppositely directed, radially extending peaks around the circumference thereof, and the walls of the matrix are connected peak-to-peak to define the radially extending voids therebetween.

Preferably, the honeycomb material is a conventional synthetic resin paper material that is coated with a phenolic resin. The material is preformed in the desired shape so that the matrix substantially fills the annular space between the conduit and the housing along the desired length of space, without deformation. As shown best in FIG. 3, as a result of the space requirements for the matrix, the voids are defined by a common length, and each void is generally shaped like a truncated cone, with a smaller diameter at the radially inner end than at the outer end.

Returning to FIG. 4, the second support matrix 26 is shown to substantially fill the portion of the annular space adjacent the structural wall 12 and defines a plurality of longitudinal voids extending in a direction substantially parallel to the length of the conduit. As illustrated in FIG. 4, the second support matrix is formed of a honeycomb material including a plurality of tubular serpentine walls 44 each presenting a series of alternating, oppositely directed, longitudinally extending peaks around circumference thereof, the walls being connected peak-to-peak to define the longitudinal voids. As with the first matrix 24, the honeycomb material of the second matrix 26 is also preferably formed of a conventional synthetic resin paper material that is coated with a phenolic resin.

Returning to FIG. 1, the intumescent material is shown to substantially fill the voids of the first and second support matrices. Although any desired composition of intumescent material may be used In the fire barrier 20, it is preferred that a composition be used which includes a polyether polyol, e.g. Fomox Pa which is a trademark of Mobay Corporation, a division of Bayer U.S.A., Inc., and a diphenylmethane diisocyanate, e.g. Fomox P which is also a trademark of Mobay Corporation.

An exemplary composition includes the following formulation, with all percentages shown on a weight basis.

| Fomox Pa | 50% |
| --- | --- |
| Fomox P | 20% |
| Alumina Trihydrate | 20% |
| Expandable Graphite | 5% |
| Zinc Borate | 5% |
| $H_2O$ | 0% to 0.7% |
| Baylith Powder (Zeolite) | 0% to 8% |
| Myritol | 0.05% to 0.3% |

In this exemplary composition, the baylith powder is used where it is necessary to remove excess water from the composition, and myritol is used where it is necessary to control shrinkage.

This composition is preferably injected into a mold within which the desired matrix material is positioned, and fills the voids in the matrix material. Preferably, a cure time of 15–45 minutes is allowed before the completed ring-shaped part is ready for assembly in the fire barrier.

When the fire barrier 20 is attached to a structural wall in the manner illustrated in FIG. 1, in surrounding engagement with the conduit 10 passing through the wall, the intumescent material 28 and associated support matrices 24, 26 are enclosed within the annular space defined radially between the conduit 10 and the side wall 30 of the housing 22, and longitudinally between the structural wall 12 and the end wall 36 of the housing.

If a fire develops within the room enclosed by the structural wall, the fire first causes deformation of the conduit 10, exposing the intumescent material directly to the fire. Thereafter, as shown in FIG. 5, the intumescent material in the first support matrix 24 expands rapidly in the radial direction inward toward the melting and collapsing conduit so that any hole or gap between the conduit and the hole 18 in the structural wall is filled by the expanding intumescent material. The movement of the intumescent material during expansion is directed radially inward by the first support matrix, the material being of a character that provides continuous radial movement beyond the voids of the support matrix as the material expands to fill the space previously occupied by the conduit.

As the conduit continues to melt, the intumescent material supported within the second matrix 26 is activated and expands in the longitudinal direction of the conduit. As shown in FIG. 6, continued expansion of the intumescent material within the first matrix 24 completely closes off the opening in the end plate of the housing, while further expansion of the intumescent material within the second support matrix 26 deposits intumescent material between the remains of the conduit and the structural wall.

Although it would be possible to obtain an advantageous barrier to fire by providing only the first matrix and the intumescent material therein, the intumescent material within the second matrix prevents the propagation of heat or fire through the structural wall via the first end of the housing. Thus, any fire attacking the point of connection between the housing and the structural wall is blocked from passing through the structural wall by the intumescent material released from the second support matrix. By directing this intumescent material into the structural wall, a more complete barrier to the fire is formed across the entire area of the hole.

Although the invention has been described with reference to the preferred embodiment illustrated in the attached drawing figures, it is noted that substitutions may be made and equivalents employed herein without departing from the scope of the invention as recited in the claims.

What is claimed is:

1. A fire barrier for use in connection with a structural wall having a hole through which a thermoplastic conduit extends, the fire barrier comprising:

a housing having a side wall adapted to extend around a hole and conduit and defining an interior space extending between the conduit and the housing, a first axial end configured to attach to a structural wall, and a second axial end provided with an end wall adapted to extend between the side wall and a conduit to substantially close off the interior space;

a first support matrix provided within the housing adjacent the second axial end and defining a plurality of voids adapted to extend radially between a conduit and the side wall of the housing;

a second support matrix provided within the housing adjacent the first axial end and defining a plurality of longitudinal voids adapted to extend in a direction substantially parallel to the length of the conduit;

an intumescent material substantially filling the voids of the first and second support matrices so that as a fire adjacent the wall causes failure of the conduit, the intumescent material expands in the directions of orientation of the voids and forms a barrier that prevents the fire from propagating through the hole.

2. A fire barrier as recited in claim 1, wherein the side wall of the housing is tubular, and the first and second support matrices are ring shaped.

3. A fire barrier as recited in claim 1, wherein the housing includes a plurality of radially outward extending tabs connected to the side wall for permitting attachment of the housing to the structural wall.

4. A fire barrier as recited in claim 1, wherein the end wall extends radially inward from the side wall and is formed by a plurality of tabs which are folded over one another to define the end wall.

5. A fire barrier as recited in claim 1, wherein the first support matrix is formed of a honeycomb material including a plurality of ring-shaped, serpentine walls each presenting a series of alternating, oppositely directed, radially extending peaks around the circumference thereof, the walls being connected peak-to-peak to define the radially extending voids.

6. A fire barrier as recited in claim 5, wherein the honeycomb material is formed of a synthetic resin paper coated with a phenolic resin.

7. A fire barrier as recited in claim 1, wherein the second support matrix is formed of a honeycomb material including a plurality of tubular serpentine walls each presenting a series of alternating, oppositely directed, longitudinally extending peaks around the circumference thereof, the walls being connected peak-to-peak to define the longitudinal voids.

8. A fire barrier as recited in claim 1, wherein the second matrix extends longitudinally between the structural wall and the first support matrix.

* * * * *